(12) United States Patent
Backmann et al.

(10) Patent No.: US 11,584,111 B2
(45) Date of Patent: Feb. 21, 2023

(54) BREATHABLE THERMOPLASTIC FILM WITH REDUCED SHRINKAGE

(71) Applicant: Windmoeller & Hoelscher KG, Lengerich (DE)

(72) Inventors: Martin Backmann, Lengerich (DE); Karsten Golubski, Haltern am See (DE)

(73) Assignee: Windmoeller & Hoelscher KG, Lengerich (DE)

( * ) Notice: Subject to any disclaimer, the term of this patent is extended or adjusted under 35 U.S.C. 154(b) by 327 days.

(21) Appl. No.: 16/180,197

(22) Filed: Nov. 5, 2018

(65) Prior Publication Data

US 2020/0139684 A1    May 7, 2020

(51) Int. Cl.
    *B32B 27/08*      (2006.01)
    *B32B 27/12*      (2006.01)
    *B32B 27/32*      (2006.01)

(52) U.S. Cl.
    CPC .............. *B32B 27/08* (2013.01); *B32B 27/12* (2013.01); *B32B 27/32* (2013.01); *B32B 2307/724* (2013.01)

(58) Field of Classification Search
    CPC ......... B32B 27/08; B32B 27/32; B32B 27/12; B32B 2307/724
    See application file for complete search history.

(56) References Cited

U.S. PATENT DOCUMENTS

| | | | |
|---|---|---|---|
| 3,520,964 A | 7/1970 | Metz, Jr. | |
| 3,796,785 A | 3/1974 | Rest | |
| 3,816,886 A | 6/1974 | Van Cappellen | |
| 3,891,737 A | 6/1975 | Marsh et al. | |
| 4,066,729 A | 1/1978 | Van Cappellen | |
| 4,275,105 A | 6/1981 | Boyd et al. | |

(Continued)

FOREIGN PATENT DOCUMENTS

| | | |
|---|---|---|
| CA | 2802583 A1 | 12/2010 |
| CA | 3 016 126 | 9/2017 |

(Continued)

OTHER PUBLICATIONS

Japanese Patent Office, Notice of Reasons for Rejection, Application No. 2016-567675, dated Nov. 29, 2018, 11 pages (with English translation).

(Continued)

*Primary Examiner* — Nancy R Johnson
(74) *Attorney, Agent, or Firm* — Sunstein LLP (57) ABSTRACT

Methods for stretch-forming a thermoplastic film comprises: stretching the thermoplastic film between a first roller and a second roller, wherein the first the roller rotates at a first peripheral velocity and the second roller rotates at a second peripheral velocity that is higher than the first peripheral velocity; and advancing the thermoplastic film from the second roller to a third roller, wherein the third roller rotates at a third peripheral velocity that is lower than the second peripheral velocity, wherein a ratio of the third peripheral velocity to the second peripheral velocity is no larger than 0.95. The resulting breathable thermoplastic films may have a basis weight of no larger than 15 $g/m^2$ and a shrinkage of no larger than 5%.

9 Claims, 3 Drawing Sheets

(56) References Cited

U.S. PATENT DOCUMENTS

| | | |
|---|---|---|
| 4,310,485 A | 1/1982 | Dauber |
| 4,353,945 A | 10/1982 | Sampson |
| 4,436,888 A | 3/1984 | Copple |
| 4,632,869 A | 12/1986 | Park et al. |
| 4,668,463 A | 5/1987 | Cancio et al. |
| 4,704,238 A | 11/1987 | Okyuama et al. |
| 4,705,812 A | 11/1987 | Ito et al. |
| 4,713,068 A | 12/1987 | Wang et al. |
| 4,713,069 A | 12/1987 | Wang et al. |
| 4,725,481 A | 2/1988 | Ostapchenko |
| 4,758,462 A | 7/1988 | Park et al. |
| 4,874,567 A | 10/1989 | Lopatin |
| 4,929,303 A | 5/1990 | Sheth |
| 5,028,289 A | 7/1991 | Rasmussen |
| 5,192,606 A | 3/1993 | Proxmire et al. |
| 5,236,963 A | 8/1993 | Jacoby et al. |
| 5,261,899 A | 11/1993 | Visscher et al. |
| 5,365,868 A | 11/1994 | Culotta |
| 5,382,461 A | 1/1995 | Wu |
| 5,422,172 A | 6/1995 | Wu |
| 5,445,862 A | 8/1995 | Kaneko et al. |
| 5,560,974 A | 10/1996 | Langley |
| 5,709,932 A | 1/1998 | Glez et al. |
| 5,814,178 A | 9/1998 | Jacobs |
| 5,843,056 A | 12/1998 | Good et al. |
| 5,855,999 A | 1/1999 | McCormack |
| 6,033,509 A | 3/2000 | Miyamoto et al. |
| 6,037,281 A | 3/2000 | Mathis et al. |
| 6,045,900 A | 4/2000 | Haffner et al. |
| 6,046,118 A | 4/2000 | Jones et al. |
| 6,075,179 A | 6/2000 | McCormack et al. |
| 6,156,421 A | 12/2000 | Stopper |
| 6,179,939 B1 * | 1/2001 | Jones, Jr. ............. B29C 55/065 156/164 |
| 6,245,271 B1 | 6/2001 | Jacobs et al. |
| 6,258,308 B1 | 7/2001 | Brady et al. |
| 6,264,872 B1 | 7/2001 | Majors et al. |
| 6,277,479 B1 | 8/2001 | Campbell et al. |
| 6,309,736 B1 | 10/2001 | McCormack et al. |
| 6,375,781 B1 | 4/2002 | Wojcik et al. |
| 6,506,695 B2 | 1/2003 | Gardner et al. |
| 6,509,513 B2 | 1/2003 | Glaug et al. |
| 6,575,726 B1 | 6/2003 | Nissel |
| 6,638,636 B2 | 10/2003 | Tucker |
| 6,653,523 B1 | 11/2003 | McCormack et al. |
| 6,659,990 B1 | 12/2003 | Odorzynski et al. |
| 6,676,871 B1 | 1/2004 | Benassi et al. |
| 6,811,643 B2 | 11/2004 | McAmish et al. |
| 6,818,083 B2 | 11/2004 | McAmish et al. |
| 6,909,028 B1 * | 6/2005 | Shawver ............ A61F 13/51462 604/370 |
| 6,953,510 B1 | 10/2005 | Mackay et al. |
| 6,991,758 B2 | 1/2006 | Krumm et al. |
| 7,160,949 B2 | 1/2007 | Ota et al. |
| 7,270,723 B2 | 9/2007 | McCormack et al. |
| 7,307,031 B2 | 12/2007 | Carroll et al. |
| 7,442,332 B2 | 10/2008 | Cancio et al. |
| 7,501,363 B2 | 3/2009 | Dharmadhikary et al. |
| 7,510,758 B2 | 3/2009 | Thomas et al. |
| 7,629,042 B2 | 12/2009 | Jones et al. |
| 7,772,137 B2 | 8/2010 | Jones |
| 7,776,771 B2 | 8/2010 | Autran et al. |
| 7,833,211 B2 | 11/2010 | Mansfield |
| 7,879,452 B2 | 2/2011 | Muslet |
| 7,932,196 B2 | 4/2011 | McCormack et al. |
| 8,007,616 B2 | 8/2011 | Jones et al. |
| 8,067,501 B2 | 11/2011 | Fiscus et al. |
| 8,092,731 B2 | 1/2012 | Guenanten et al. |
| 8,163,216 B2 | 4/2012 | Bormann et al. |
| 8,298,630 B2 | 10/2012 | Nitta et al. |
| 8,383,246 B2 | 2/2013 | Frauenhofer et al. |
| 8,445,744 B2 | 5/2013 | Autran et al. |
| 8,691,106 B2 | 4/2014 | Didier |
| 8,865,294 B2 | 10/2014 | Cisek |
| 8,937,211 B2 | 1/2015 | Dent et al. |
| 9,302,423 B2 | 4/2016 | Bayer et al. |
| 9,492,332 B2 | 11/2016 | Cancio et al. |
| 9,573,729 B2 | 2/2017 | Cobler |
| D811,897 S | 3/2018 | Cisek |
| D811,898 S | 3/2018 | Pszczolkowski |
| D811,899 S | 3/2018 | Kuhl |
| D813,054 S | 3/2018 | Pszczolkowski |
| D817,779 S | 5/2018 | Pszczolkowski |
| D842,706 S | 3/2019 | Pszczolkowski |
| 2002/0074691 A1 | 6/2002 | Mortellite |
| 2002/0187361 A1 | 12/2002 | Amon |
| 2003/0039851 A1 | 2/2003 | Hale |
| 2003/0045844 A1 | 3/2003 | Taylor et al. |
| 2003/0077471 A1 | 4/2003 | Tucker |
| 2003/0161995 A1 | 8/2003 | Kauschke et al. |
| 2004/0015142 A1 | 1/2004 | Johnston et al. |
| 2004/0077248 A1 | 4/2004 | Kurahashi et al. |
| 2004/0122398 A1 | 6/2004 | Schnabel et al. |
| 2004/0157333 A1 | 8/2004 | McAmish et al. |
| 2005/0042962 A1 | 2/2005 | McCormack et al. |
| 2005/0248051 A1 | 11/2005 | Cancio et al. |
| 2006/0147716 A1 | 7/2006 | Braverman |
| 2006/0148361 A1 | 7/2006 | Ng |
| 2006/0188390 A1 | 8/2006 | Galloway et al. |
| 2007/0218796 A1 | 9/2007 | Yao |
| 2008/0147034 A1 | 6/2008 | Wang et al. |
| 2008/0233375 A1 | 9/2008 | Wright |
| 2010/0040875 A1 | 2/2010 | Patel |
| 2010/0076390 A1 | 3/2010 | Norrby |
| 2010/0216963 A1 | 8/2010 | Ueda |
| 2011/0003099 A1 | 1/2011 | Vinck |
| 2011/0006452 A1 | 1/2011 | Bayer et al. |
| 2011/0052105 A1 | 3/2011 | Wilcoxen |
| 2011/0282313 A1 | 11/2011 | Lu et al. |
| 2012/0033900 A1 | 2/2012 | Fraser |
| 2012/0063706 A1 | 3/2012 | Fraser |
| 2012/0077113 A1 | 3/2012 | Kim et al. |
| 2012/0237743 A1 | 9/2012 | O'Donnell et al. |
| 2012/0237746 A1 | 9/2012 | O'Donnell et al. |
| 2012/0269465 A1 | 10/2012 | Dorsey |
| 2012/0315225 A1 * | 12/2012 | Porbeni ............ A61L 15/26 424/49 |
| 2013/0028542 A1 | 1/2013 | Borchardt |
| 2013/0041335 A1 | 2/2013 | Dwiggins et al. |
| 2013/0202853 A1 | 8/2013 | Bergman |
| 2014/0127492 A1 * | 5/2014 | Stokes ............ A41D 31/102 428/220 |
| 2014/0248484 A1 | 9/2014 | Bormann et al. |
| 2015/0267016 A1 | 9/2015 | Humiston et al. |
| 2015/0328058 A1 * | 11/2015 | Cancio ............ B29C 48/08 428/219 |
| 2016/0114071 A1 | 4/2016 | Topolkaraev |
| 2016/0114074 A1 | 4/2016 | Topolkaraev et al. |
| 2016/0151950 A1 | 6/2016 | Backmann et al. |
| 2018/0141304 A1 | 5/2018 | Franklin |
| 2019/0076299 A1 | 3/2019 | Börmann |
| 2019/0084280 A1 | 3/2019 | Börmann |

FOREIGN PATENT DOCUMENTS

| | | |
|---|---|---|
| CA | 3 016 130 | 9/2017 |
| CN | 102292056 | 12/2001 |
| CN | 100430221 C | 11/2004 |
| CN | 1976797 | 6/2007 |
| CN | 1976797 B | 12/2010 |
| CN | 101959907 | 1/2011 |
| EP | 0283200 A2 | 9/1988 |
| EP | 0283200 B1 | 8/1994 |
| EP | 0 907 342 B1 | 4/2003 |
| EP | 0 948 558 B1 | 11/2003 |
| EP | 1423275 A1 | 6/2004 |
| EP | 1 250 225 B1 | 8/2005 |
| EP | 1 079 970 B1 | 5/2010 |
| EP | 1423275 B1 | 7/2011 |
| EP | 3312221 A1 | 4/2018 |
| JP | 4309546 | 11/1992 |
| JP | H04335043 | 11/1992 |
| JP | 6-64080 | 3/1994 |
| JP | H07-16939 A | 1/1995 |

(56) References Cited

FOREIGN PATENT DOCUMENTS

| | | |
|---|---|---|
| JP | 9059408 | 3/1997 |
| JP | 2003-039612 | 2/2003 |
| JP | 2003-526710 | 9/2003 |
| JP | 2005-513960 A | 5/2005 |
| JP | 2005518290 | 6/2005 |
| JP | 2005525247 A | 8/2005 |
| JP | 2006-199786 | 8/2006 |
| JP | 2007-045046 A | 2/2007 |
| JP | 2007503326 | 2/2007 |
| JP | 2007536110 | 12/2007 |
| JP | 2011514391 | 5/2011 |
| KR | 10-2007-0007893 | 1/2007 |
| WO | WO 93/06158 | 4/1993 |
| WO | WO 98/05501 | 2/1998 |
| WO | WO 98/05502 | 2/1998 |
| WO | WO 99/14262 | 3/1999 |
| WO | WO 99/22930 | 5/1999 |
| WO | WO 99/33654 | 7/1999 |
| WO | WO 00/23509 | 4/2000 |
| WO | WO 01/047710 A1 | 7/2001 |
| WO | WO 01/51548 A2 | 7/2001 |
| WO | WO 01/058685 A1 | 8/2001 |
| WO | WO 03/020513 A1 | 3/2003 |
| WO | WO 03/035394 A1 | 5/2003 |
| WO | WO 2003/072338 A1 | 9/2003 |
| WO | WO 2005/021262 A1 | 3/2005 |
| WO | WO 2005/110713 A1 | 11/2005 |
| WO | WO 2007/022990 A1 | 3/2007 |
| WO | WO 2007/081548 | 7/2007 |
| WO | WO 2009/094506 | 7/2009 |
| WO | WO 2011/019504 A1 | 2/2011 |
| WO | WO 2011/019504 A1 | 2/2011 |
| WO | WO 2014/199268 A1 | 12/2014 |
| WO | WO 2015/175593 A1 | 11/2015 |
| WO | WO 2015/186808 A1 | 12/2015 |
| WO | WO 2017/162746 A1 | 9/2017 |
| WO | WO 2017/162748 A1 | 9/2017 |

OTHER PUBLICATIONS

Indonesia Patent Office, Office Action, Application No. P-00201607612, dated Dec. 21, 2018, 5 pages (with English summary).
Egypt Patent Office, Notice of Decision for Egyptian App. No. 1816/2016, dated Jan. 30, 2019, 13 pages (with English summary).
United States Patent and Trademark Office, Office Action, U.S. Appl. No. 15/431,073, dated Feb. 14, 2019, 15 pages.
United States Patent and Trademark Office, Office Action, U.S. Appl. No. 15/876,483, dated Feb. 14, 2019, 9 pages.
Clopay Plastic Products, Product Data Sheet BR 124, 1 page.
Windmöller & Hölcher, Technical Data Sheet, 2013, 2 pages.
Chinese Patent Office, Office Action, with English translation, CN Application No. 2015800270287, 9 pages, dated Jan. 30, 2018.
European Patent Office/International Searching Authority, International Search Report and Written Opinion, Application No. PCT/US2015/030463, 14 pages, dated Oct. 2, 2015.
United States Patent and Trademark Office, Non-final Office Action, U.S. Appl. No. 14/709,728, 17 pages, dated Apr. 22, 2016.
United States Patent and Trademark Office, Notice of Allowance, U.S. Appl. No. 14/709,728, 8 pages, dated Aug. 10, 2016.
United States Patent and Trademark Office, Office Action, U.S. Appl. No. 15/341,103, 12 pages, dated Jul. 25, 2018.
European Patent Office, Extended European Search Report, Application No. 18159121.5, 12 pages, dated Jun. 26, 2018.
European Patent Office, Communication pursuant to Article 94(3) EPC, Application No. 15724480.7, 6 pages, dated Jun. 18, 2018.
U.S. Patent and Trademark Office, Office Action, U.S. Appl. No. 15/341,103, dated Dec. 11, 2018, 21 pages.
U.S. Patent and Trademark Office, Office Action, U.S. Appl. No. 15/442,867, dated Dec. 11, 2018, 8 pages.
U.S. Patent and Trademark Office, Office Action, U.S. Appl. No. 15/206,072, dated Jan. 15, 2019, 13 pages.
Database WPI, Week 201602, Thomson Scientific, London, GB; AN 2015-7815H, XP002790536, 2 pages.
European Patent Office, Partial European Search Report, Application No. 18204304.20, dated May 2, 2019, 12 pages.
European Patent Office, Extended European Search Report, Application No. 18204304.2, dated Jun. 19, 2019, 13 pages.
Australian Government, IP Australia, Examination Report ,Application No. 2015259236, dated Feb. 26, 2019, 3 pages.
European Patent Office, Extended European Search Report, Application No. 16824959.7, dated Feb. 19, 2019, 8 pages.
Korean Intellectual Property Office, Korean Preliminary Rejection, Application No. 10-2016-7034770, dated Jan. 21, 2019, 15 pages (with English translation( ).
Australian Patent Office, First Examination Report, Application No. 2016350820, dated May 24, 2019, 6 pages.
United States Patent and Trademark Office, Office action, U.S. Appl. No. 15/442,867, dated Jun. 5, 2019, 8 pages.
United States Patent and Trademark Office, Office Action, U.S. Appl. No. 15/206,072, dated Aug. 23, 2019, 16 pages.
Spruson & Ferguson, Notice of Opposition, Application No. AU2015259236, dated Aug. 23, 2019, 3 pages.
United States Patent and Trademark Office, Office Action, U.S. Appl. No. 15/341,103, dated Sep. 10, 2019, 15 pages.
Columbian Patent Office, Office Action, Application No. NC2018/0000374, dated Nov. 5, 2019, with English translation, 31 pages.
European Patent Office, Communication pursuant to Article 93(3) EPC, Application No. 16824959.7, dated Oct. 31, 2019, 6 pages.
Korean Intellectual Property Office, Notice of Preliminary Rejection, Application No. 10-2016-7034770, dated Nov. 28, 2019, with English translation, 5 pages.
U.S. Patent and Trademark Office, Office Action, U.S. Appl. No. 15/206,072, dated May 17, 2019, 12 pages.
Canadian Intellectual Property Office, Office Action, Application No. 3,004,264, dated Apr. 9, 2019, 8 pages.
Columbian Patent Office, Office Action, Application No. NC2018/0004912, dated Jan. 29, 2020, 30 pages (with English translation).
Spruson & Ferguson, Statement of Grounds & Particulars of Opposition, Australian Application No. 2015259236, sent Nov. 22, 2019, 4 pages.
Spruson & Ferguson, Evidence in Support of the Opposition, Australian Application No. 2015259236, received Feb. 21, 2020, 505 pages.
Korean Intellectual Property Office, Final Office Action, Application No. 10-2018-7015313, dated Mar. 5, 2020, 8 pages (with English translation).
Japanese Patent Office, Office Action, Application No. 2018-522690, dated Jan. 30, 2020, 9 pages (with English translation).
Brazilian Patent Office, Preliminary Examination Report, Application No. BR112018008995-8, dated Feb. 28, 2020, 5 pages (no English translation available).
Australian Patent Office, Examination Report No. 1, Application No. 2016293826, dated Mar. 31, 2020, 3 pages.
United States Patent and Trademark Office, Office Action, U.S. Appl. No. 15/206,072, dated Apr. 6, 2020, 24 pages.
Saudi Arabia Patent Office, Examination Report, Application No. 516380252, with English translation, dated Jan. 28, 2020, 8 pages.
Korean Intellectual Property Office, Final Office Action, Application No. 10-2018-7015313, dated Dec. 23, 2019, with English translation, 10 pages.
China National Intellectual Property Administration, Office Action, Application No. 201680077856.6, dated Dec. 4, 2019, with English translation, 34 pages.
Australian Patent Office, Examination Report No. 2, Application No. 2016350820, dated Jan. 8, 2020, 4 pages.
United States Patent and Trademark Office, Non-Final Office Action, U.S. Appl. No. 15/431,073, dated Jan. 8, 2020, 17 pages.
United States Patent and Trademark Office, Non-Final Office Action, U.S. Appl. No. 15/442,867, dated Feb. 4, 2020, 9 pages.
European Patent Office, Communication pursuant to Article 94(3) EPC, Application No. EP16824959.7, dated Jun. 3, 2020, 11 pages.
United States Patent and Trademark Office, Office Action, U.S. Appl. No. 15/431,073, dated Jun. 11, 2020, 18 pages.

(56) References Cited

OTHER PUBLICATIONS

Australian Patent Office, Notice of Acceptance for Patent Application, Application No. 2016350820, dated Jun. 5, 2020, 3 pages.
United States Patent and Trademark Office, Office Action, U.S. Appl. No. 15/442,867, dated Aug. 3, 2020, 10 pages.
Indian Intellectual Property Office, Hearing Notice, Application No. 201627041571, dated Sep. 4, 2020, 2 pages.
Indian Intellectual Property Office, First Examination Report, Application No. 201817001177, dated Aug. 24, 2020, 9 pages.
United States Patent and Trademark Office, Final Office Action, U.S. Appl. No. 15/206,072, dated Aug. 28, 2020, 26 pages.
Japanese Patent Office, Office Action, Application No. 2018-521194, dated Jun. 30, 2020, 27 pages (with English summary).
Egyptian Patent Office, Office Action, Application No. 1816/2016, dated Jun. 28, 2020, 11 pages (with English summary).
China National Intellectual Property Administration, Office Action, Application No. 201680077856.6, dated Jul. 21, 2020, 23 pages (with English summary).
European Patent Office, Office Action, Application No. 16862828.7, dated Oct. 21, 2020, 5 pages.
Evidence in Reply for Opposition of Australian Application No. 2015259236, received Jul. 29, 2020, 255 pages.
SML, 100% Extrustion Cast Film Lines: Hygiene Film Brochure, Oct. 2013, 28 pages.
SML, Innovation Days Invitation, No. 13-15, 2012, 2 pages.

* cited by examiner

BREATHABLE THERMOPLASTIC FILM WITH REDUCED SHRINKAGE

TECHNICAL FIELD

The disclosure relates to an improved breathable thermoplastic film with reduced shrinkage, and an apparatus and method for producing such a thermoplastic film.

BACKGROUND ART

Breathable thermoplastic films are used for a variety of different applications, such as for packaging and for personal hygiene products. Such films may be produced by blow extrusion or cast extrusion of a polymeric composition comprising at least one thermoplastic polymer, such as polyethylene (PE) or polyethylene terephthalate (PET) and a filler material, such as calcium carbonate. The extruded solid film may be stretch-formed in a stretching device, sometimes also referred to as an orientation device. Stretch-forming in the machine direction and/or in the cross direction may allow to adjust a thickness of the resulting film. At the same time, the stretching of the film leads to the formation of micropores at the boundaries of the filler material with the surrounding thermoplastic polymer matrix, so that the film becomes breathable, i.e., vapor permeable. The stretched film may be wound in a winder device to form a reel of a film that can be stored and transported.

Blow-extrusion methods and devices of this type are described in more detail in US 2011/0006452 A1 and US 2016/0151950 A1, and a cast extrusion process is described in U.S. Pat. No. 9,492,332 B2, all of which publications are incorporated herein by reference.

As emphasized for instance in U.S. Pat. No. 9,492,332 B2, incorporated herein by reference, there is a growing need in the industry for thin and lightweight breathable thermoplastic films, for reasons of conservation of resources, waste reduction, comfort and cost. One way to adjust and reduce the thickness and basis weight of the film is by enhanced stretching in the stretching device. A high stretching factor is also desirable to increase the number of micropores in the thermoplastic film, and hence the breathability of the film. However, enhanced stretching during manufacturing may lead to an undesirable residual shrinkage of the manufactured breathable thermoplastic film, for instance when the finished film is exposed to heat during storage or transportation. This shrinkage may be due to a re-orientation of the polymeric molecules under heat exposure that partly reverses the molecular orientation resulting from the stretching. As described in WO 2017/162748 A1 and WO 2017/162746 A1, both incorporated herein by reference, shrinkage may result in a blocking of the reeled film, so that neighboring layers of film adhere to one another. This may cause problems when unreeling the film for further production, and may even lead to structural damages and fissures in the film. The problem is particularly pronounced for thin films, which are even more susceptible to breaks and fissures.

In view of these problems and the prior art, there is a need for improved methods and techniques for producing breathable thermoplastic thin films with reduced shrinkage.

SUMMARY OF EMBODIMENTS OF THE INVENTION

The aforesaid objective may be achieved with a breathable thermoplastic film in accordance with embodiments of the present invention, and in accordance with embodiments of the present invention that include a stretching device for stretch-forming a thermoplastic film and methods for stretch-forming a thermoplastic film.

Methods and devices of the present disclosure allow for production of breathable thermoplastic films with a low basis weight and a shrinkage that is lower than what has previously been possible to achieve for such films.

In one aspect, the present disclosure relates to a breathable thermoplastic film having a basis weight of no larger than 15 g/m$^2$ and a shrinkage of no larger than 5%.

In the context of the present disclosure, a thermoplastic film is a film comprising at least one thermoplastic component. In general, a thermoplastic film may comprise a plurality of components, comprising at least one thermoplastic component or a plurality of thermoplastic components as well as further non-thermoplastic components, such as filler material.

A breathable thermoplastic film, in the context of the present disclosure, is a film that is vapor permeable.

According to an example, the basis weight of the breathable thermoplastic film is no larger than 14 g/m$^2$, or no larger than 13 g/m$^2$, or no larger than 12 g/m$^2$, or no larger than 11 g/m$^2$, or no larger than 10 g/m$^2$, or no larger than 9 g/m$^2$, or no larger than 8 g/m$^2$.

The techniques of the present disclosure allow to produce films having a basis of 8 g/m$^2$ or less, and still limit the shrinkage to 5% or less.

According to some examples, the shrinkage may be no larger than 4%, or no larger than 3%, or no larger than 2%, or no larger than 1%.

According to an example, the shrinkage may be a shrinkage in a machine direction of the thermoplastic film. A machine direction, in the sense of the present disclosure, may denote a direction along which the thermoplastic film is advanced, and/or stretched during manufacturing.

Alternatively or additionally, shrinkage may also refer to shrinkage in a cross direction. A cross direction, in the sense of the present disclosure, may denote a direction perpendicular to a direction along which the thermoplastic film is advanced and/or stretched during manufacturing, i.e., perpendicular to the machine direction.

There are different techniques for determining shrinkage in the context of the present disclosure. In an example, shrinkage is determined according to the industry standard DIN 55543-4. The standard is available from Deutsches Institut für Normung e.V. and Beuth Verlag GmbH, Berlin, Germany (March 2017) and is incorporated herein by reference.

Shrinkage, in the sense of the present disclosure, may be a linear shrinkage, or an area shrinkage.

In some examples, the shrinkage is a residual shrinkage. A residual shrinkage may be a shrinkage measured below a crystallite melting point of the breathable thermoplastic film.

According to an example, the shrinkage may be determined by immersion of the film in a hot fluid bath at a predetermined immersion temperature for a predetermined immersion time.

According to an example, the immersion temperature is chosen above a crystallite melting point of the film.

According to another example, the immersion temperature is chosen below a crystallite melting point of the film.

In some examples, the immersion temperature is no smaller than 60° C., or no smaller than 70° C., or no smaller than 75° C., or no smaller than 90° C., or no smaller than 100° C., or no smaller than 110° C.

In some examples, the immersion temperature is no larger than 150° C., or no larger than 140° C., or no larger than 130° C.

In some embodiments, the immersion temperature is no larger than 90° C., or no larger than 85° C., or no larger than 80° C.

According to some examples, the immersion time is no smaller than 10 s, or no smaller than 15 s, or no smaller than 20 s.

The immersion time may be chosen no larger than 50 s, or no larger than 40 s, or no larger than 30 s.

According to an embodiment, the film has a water vapor transmission rate of no smaller than 500 grams H2O/(24 h m$^2$).

The water vapor transmission rate is a measure of film breathability and can be expressed in units of grams H2O/(24 h m$^2$) or other units, and may be measured according to ASTM method D-6701-01.

Despite the reduced shrinkage, the techniques according to the present disclosure allow to achieve thin films with high water vapor transmission rate.

In some examples, the water vapor transmission rate is no smaller than 750 grams H2O/(24 h m$^2$), or no smaller than 1,000 grams H2O/(24 h m$^2$), or no smaller than 2,000 grams H2O/(24 h m$^2$), or no smaller than 3,000 grams H2O/(24 h m$^2$).

According to an embodiment, the film comprises at least one thermoplastic polymer.

In some examples, the film comprises a plurality of thermoplastic polymers.

The thermoplastic polymer may comprise polyethylene terephthalate (PET) and/or polyethylene (PE). However, the thermoplastic polymer may additionally or alternatively also comprise other polymeric material.

Specifically, the film may comprise at least 10% by weight of a thermoplastic polymer.

In some examples, the film comprises at least 20% by weight of a thermoplastic polymer, in particular at least 30%.

In some examples, the film comprises at most 50% by weight of a thermoplastic polymer, or at most 40%, and in particular at most 30%.

In some examples, the film comprises a filler material.

Particularly, the film may comprise at least 20% by weight of a filler, or at least 30%, and in some examples at least 40%.

According to some embodiments, the film may comprise at most 70% by weight of a filler, or at most 60%, and in particular at most 50%.

Varying the amount of the filler in the thermoplastic film may allow to adjust the behavior under stretching, and/or the water vapor transmission rate.

According to an example, the filler material may comprise calcium carbonate. However, other filler materials may likewise be employed.

In some examples, the film is a single-layer film.

In other examples, the film is a multi-layer film, comprising a plurality of layers, wherein some or all of these layers may comprise a thermoplastic polymer and/or a filler as described above.

In some examples, the breathable thermoplastic film may be connected to a substrate, such as a textile or plastics fiber material.

Hence, according to another aspect the disclosure also relates to a laminated article, comprising a substrate and at least one breathable thermoplastic film connected to the substrate, wherein the breathable thermoplastic film is a film with some or all of the features described above.

According to an independent aspect, the disclosure also relates to a stretching device for stretch-forming a thermoplastic film, comprising a first roller adapted to advance the thermoplastic film, wherein the first roller is adapted to be rotated at a first peripheral velocity. The stretching device further comprises a second roller downstream of the first roller, wherein the second roller is adapted to receive the thermoplastic film from the first roller, wherein the second roller is adapted to be rotated at a second peripheral velocity higher than the first peripheral velocity to stretch the thermoplastic film. The stretching device further comprises a third roller downstream of the second roller, wherein the third roller is adapted to receive the thermoplastic film from the second roller, wherein the third roller is adapted to be rotated at a third peripheral velocity lower than the second peripheral velocity to allow shrinkage of the thermoplastic film, wherein a ratio of the third peripheral velocity to the second peripheral velocity is no larger than 0.95.

The first roller and the second roller downstream of the first roller may together define a so-called stretching gap or stretching nip. Due to the enhanced peripheral velocity of the second roller, the second roller may exert a high pulling force or stretching force on the thermoplastic film, resulting in an elongation of the thermoplastic film along the transport direction of the thermoplastic film, which is also referred to herein as the machine direction.

In some examples, a ratio of the second peripheral velocity to the first peripheral velocity is at least 2, and in particular at least 3.

Downstream location of the second roller with respect to the first roller may denote a location downstream along the machine direction, i.e., downstream along a transport direction of the thermoplastic film through the stretching device.

The third roller may be located downstream of the second roller, in the sense that the second roller precedes the third roller in machine direction. The third roller may be located directly downstream of the second roller, in the sense that the second roller passes the thermoplastic film directly to the third roller. In other examples, there may be additional rollers or other components located in between the second roller and the third roller.

According to the present disclosure, the third roller is adapted to rotate at a third peripheral velocity that is lower than the second peripheral velocity, wherein a ratio of the third peripheral velocity to the second peripheral velocity is no larger than 0.95. Selecting the second and third peripheral velocity in this velocity ratio range allows the thermoplastic film to shrink during manufacturing, which may allow the polymeric molecules of the thermoplastic film to reorganize at least partially. As a result, the thermoplastic film is less susceptible to residual shrinkage after manufacturing.

The techniques of the present disclosure allow to manufacture breathable thermoplastic films with a low basis rate of no larger than 15 g/m$^2$ while still maintaining a shrinkage of no larger than 5%, as described above.

According to an example, the ratio of the third peripheral velocity to the second peripheral velocity is no larger than 0.94, or no larger than 0.93, or no larger than 0.92, or no larger than 0.91, or no larger than 0.90, or no larger than 0.89, or no larger than 0.88, or no larger than 0.87, or no larger than 0.86, or no larger than 0.85.

According to some examples, the ratio of the third peripheral velocity to the second peripheral velocity is no smaller than 0.70, or no smaller than 0.75, or no smaller than 0.80, or no smaller than 0.85.

The stretching device may in some examples comprise one or more additional rollers, either before the first roller, in between the first roller and the second roller, in between the second roller and the third roller, or downstream of the third roller, in machine direction.

Some or all of the rollers of the stretching device may be adapted to be temperature-adjusted, such as by means of heating units and/or cooling units.

In an example, the stretching device is adapted to heat the second roller to a second temperature and to heat the third roller to a third temperature, wherein a ratio of the third temperature to the second temperature is no smaller than 1.03.

By heating the third roller to a higher temperature than the second roller, the molecular reorganization of the thermoplastic film may be supported, thereby further reducing the risk of shrinking after manufacturing.

According to some examples, the ratio of the third temperature to the second temperature may be no smaller than 1.04, or no smaller than 1.05, or no smaller than 1.06, or no smaller than 1.07, or no smaller than 1.08, or no smaller than 1.09, or no smaller than 1.10, or no smaller than 1.11, or no smaller than 1.12, or no smaller than 1.13, or no smaller than 1.14, or no smaller than 1.15.

According to some embodiments, the ratio of the third temperature to the second temperature may be no larger than 1.20, or no larger than 1.25.

Alternatively or additionally, the temperature relation between the third roller and the second roller may be characterized in terms of a temperature difference rather than a temperature ratio.

In some examples, the third temperature is at least 5° C. higher than the second temperature.

In other examples, the third temperature is at least 7° C. higher than the second temperature, or at least 10° C. higher than the second temperature, or at least 15° C. higher than the second temperature.

According to an embodiment, the stretching device further comprises a fourth roller downstream of the third roller, wherein the fourth roller may be adapted to cool the thermoplastic film.

In some examples, the fourth roller is located immediately downstream of the third roller in machine direction. In other examples, one or several additional rollers or other devices are located in between the third roller and the fourth roller.

The stretching device may be adapted to rotate the fourth roller at a fourth peripheral velocity different from the third peripheral velocity, i.e., lower or higher than the third peripheral velocity.

In some examples, a ratio of the fourth peripheral velocity to the third peripheral velocity, or vice versa, is at least 1.03, and in particular at least 1.05.

The stretching device may be adapted to cool the fourth roller to a fourth temperature, wherein a ratio of the fourth temperature to a third temperature of the third roller is no larger than 0.7.

In some examples, the ratio of the fourth temperature to the third temperature is no larger than 0.6, and in particular no larger than 0.5.

In some examples, the stretching device further comprises a pre-heating roller upstream of the first roller, wherein the stretching device is adapted to adjust the pre-heating roller to a pre-heating temperature that is smaller than a temperature of the first roller and/or a temperature of the second roller.

In some examples, the pre-heating roller is located directly upstream of the first roller in machine direction, in the sense that the first roller receives the thermoplastic film directly from the pre-heating roller. In other examples, one or several additional rollers or other devices may be located in between the pre-heating roller and the first roller.

The stretching device according to the present disclosure may be integrated into an apparatus for producing a thermoplastic film as described above in the Background Art section.

Hence, in an independent aspect the disclosure relates to an apparatus for producing a thermoplastic film, comprising an extrusion device for extruding the thermoplastic film, a stretching device for stretch-forming the thermoplastic film, wherein the stretching device is located downstream of the extrusion device and is a stretching device with some or all of the features described above; and a winder device for winding the stretched thermoplastic film, wherein the winder device is located downstream of the stretching device.

Downstream, in the sense of the present disclosure, may again refer to a transport direction of the thermoplastic film through the apparatus, sometimes also referred to as machine direction.

In some examples, the stretching device may be located immediately downstream of the extrusion device, in the sense that it receives the thermoplastic film directly from the extrusion device. In other examples, additional devices or components may be located in between the extrusion device and the stretching device in the machine direction.

Similarly, the winder device may be located immediately downstream of the extrusion device, in the sense that the winder device receives the thermoplastic film directly from the stretching device. In other examples, additional devices or components may be located in between the stretching device and the winder device in machine direction.

In an independent aspect, the disclosure also relates to a method for stretch-forming a thermoplastic film, comprising: stretching the thermoplastic film between a first roller and a second roller, wherein the first roller rotates at a first peripheral velocity and the second roller rotates at a second peripheral velocity that is higher than the first peripheral velocity; and advancing the thermoplastic film from the second roller to a third roller, wherein the third roller rotates at a third peripheral velocity that is lower than the second peripheral velocity; wherein a ratio of the third peripheral velocity to the second peripheral velocity is no larger than 0.95.

According to an example, the ratio of the third peripheral velocity to the second peripheral velocity is no larger than 0.94, or no larger than 0.93, or no larger than 0.92, or no larger than 0.91, or no larger than 0.90, or no larger than 0.89, or no larger than 0.88, or no larger than 0.87, or no larger than 0.86, or no larger than 0.85.

According to an example, the ratio of the third peripheral velocity to the second peripheral velocity is no smaller than 0.70, or no smaller than 0.75, or no smaller than 0.80, or no smaller than 0.85.

The method may in some examples further comprise: heating the second roller to a second temperature, and heating the third roller to a third temperature, wherein a ratio of the third temperature to the second temperature is no smaller than 1.03.

In some examples, the ratio of the third temperature to the second temperature is no smaller than 1.04, or no smaller than 1.05, or no smaller than 1.06, or no smaller than 1.07, or no smaller than 1.08, or no smaller than 1.09, or no smaller than 1.10, or no smaller than 1.11, or no smaller than 1.12, or no smaller than 1.13, or no smaller than 1.14, or no smaller than 1.15.

In some examples, the ratio of the third temperature to the second temperature is no larger than 1.20, or no larger than 1.25.

According to an embodiment the third temperature is at least 5° C. higher than the second temperature.

In some examples, the third temperature is at least 7° C. higher than the second temperature, or at least 10° C. higher than the second temperature, or at least 15° C. higher than the second temperature.

According to an embodiment, the method may further comprise cooling the thermoplastic film at a fourth roller downstream of the third roller.

According to an embodiment, the fourth roller may rotate at a fourth peripheral velocity higher than the third peripheral velocity.

In particular, a ratio of the fourth peripheral velocity to the third peripheral velocity is at least 1.03, or at least 1.05.

According to an embodiment, the method may further comprise cooling the fourth roller to a fourth temperature, wherein a ratio of the fourth temperature to a third temperature of the third roller is no larger than 0.7.

According to an example, the ratio of the fourth temperature to the third temperature is no larger than 0.6, and in particular no larger than 0.5.

According to an embodiment, the method may further comprise extruding the thermoplastic film upstream of the first roller, in particular by means of cast extrusion or blow extrusion.

According to an example, the method further comprises pre-heating the thermoplastic film upstream of the first roller.

In particular, the pre-heating may comprise advancing the thermoplastic film by means of a pre-heating roller, wherein the pre-heating roller may be adjusted to a pre-heating temperature that is smaller than a temperature of the first roller and/or a temperature of the second roller.

BRIEF DESCRIPTION OF THE DRAWINGS

The features and numerous advantages of the techniques and devices according to the present disclosure will be best understood from a detailed discussion of examples with reference to the accompanying Figures, in which.

DETAILED DESCRIPTION OF EMBODIMENTS OF THE INVENTION

Figure 1:
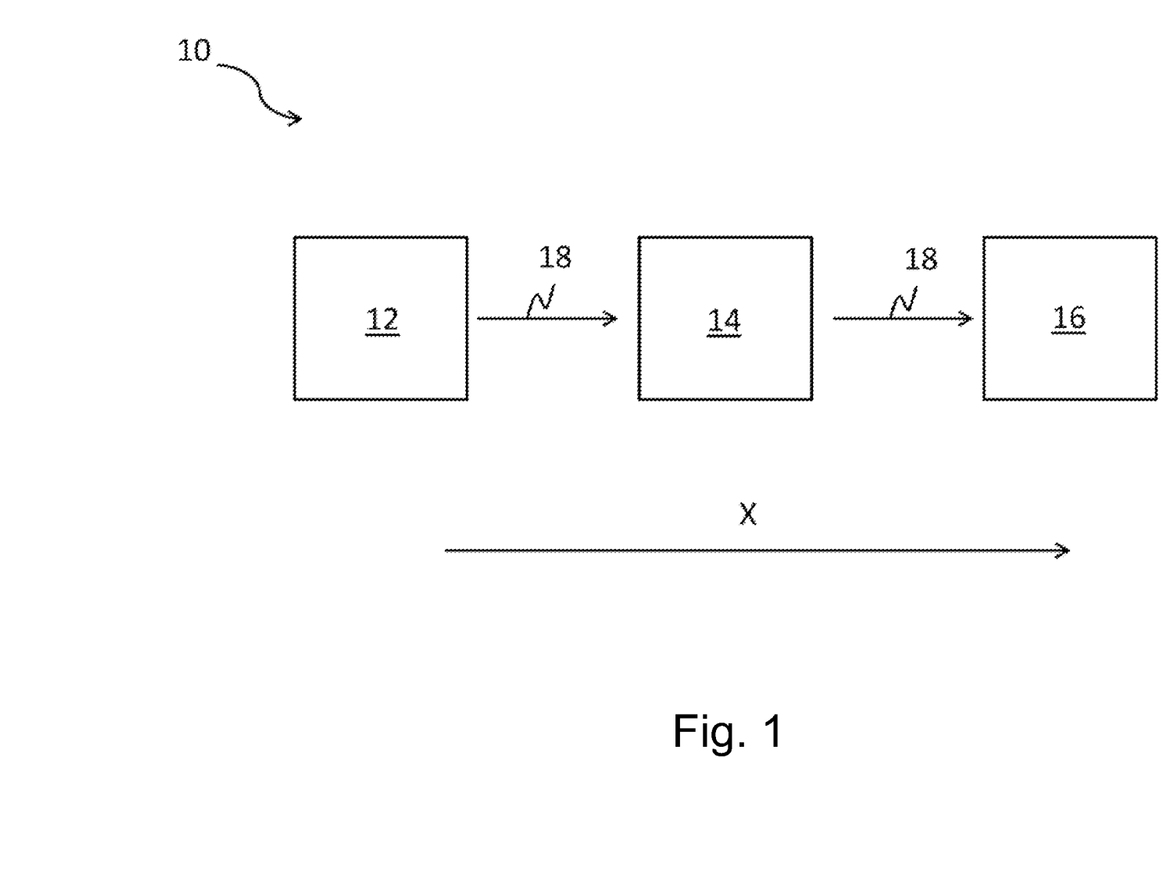
FIG. 1 is a schematic illustration of an apparatus and method for producing a thermoplastic film according to an example.

FIG. 1 is a schematic illustration of an apparatus 10 for producing breathable thin thermoplastic films, such as may be used as a back sheet of a diaper or other personal hygiene product. However, the breathable thermoplastic films according to the present disclosure have a wide array of applications across various industries. For instance, breathable thermoplastic films according to the present disclosure may likewise be employed for packaging food or consumer goods.

The extrusion device 12 may comprise an extruder (not shown) that melts a thermoplastic polymer granulate to which a filler material, such as calcium carbonate has been added, and supplies the molten and homogenized composite to a foam blowing head (not shown). The foam blowing head may include a ring nozzle (not shown) from which the extruded composite material exits. Cooling air is supplied for inflating, from the composite material, a tubular thermoplastic film, which may be kept in shape by a calibration head. Examples for a blow extrusion device of this type are described in additional detail in US 2011/0006452 A1, or in US 2016/0151950 A1, both of which are incorporated herein by reference. Alternatively, the extrusion device 12 may be a cast extrusion device, as described in U.S. Pat. No. 9,492,332 B2, incorporated herein by reference.

The resulting solid thermoplastic film 18 is passed along the machine direction X from the extrusion device 12 to the stretching device 14, which may be employed for stretch-forming the thermoplastic film 18 along the machine direction X and/or along a cross direction perpendicular to the machine direction X.

The stretched thermoplastic film 18 is advanced along the machine direction from the stretching device 14 to the winder device 16, where the thermoplastic film 18 may be wound up to form a reel of thermoplastic film, which may then be stored or transported for further manufacturing.

In some examples, the apparatus 10 may comprise additional devices or components. For instance, the apparatus 10 may comprise an interdigitated roller device comprising tensioning rollers and/or interdigitating rollers for stretching the film 18 in the machine direction X and/or in the cross direction, resulting in additional thermo-activation and enhanced breathability. For instance, an interdigitated roller device may be located in between the stretching device 14 and the winder device 16.

As described in the Background Art section above, the formed thermoplastic film may exhibit undesirable residual shrinkage, i.e. may shrink when exposed to heat during transport or further manufacturing of the thermoplastic film, such as when printing on the thermoplastic film. These problems are particularly pronounced for thin thermoplastic films, i.e. thermoplastic films having a low basis weight in the range of 15 g/m² or less.

The stretching device and stretching method of the present disclosure overcome these problems.

The stretching device 14 may comprise at least a first roller, a second roller downstream of the first roller in the machine direction, and a third roller downstream of the second roller in the machine direction X. In many implementations, the stretching device 14 may comprise additional rollers for transporting and stretch-forming the thermoplastic film 18.

Each of the rollers may be driven to rotate at a predefined peripheral velocity, i.e., a velocity measured along the periphery of the respective roller. This may include independent drive units and velocity control units for each of the rollers.

The first roller may be adapted to advance the thermoplastic film, and may be adapted to be rotated at a first peripheral velocity. The second roller downstream of the first roller may be adapted to receive the thermoplastic film 18 from the first roller, and may be adapted to be rotated at a second peripheral velocity that is higher than the first peripheral velocity. The first roller and the second roller thereby form a stretching gap or a stretching nip that stretches the thermoplastic film 18 along the machine direction X.

In some examples, the stretching device 14 additionally comprises a cross direction stretching unit (not shown) to stretch the thermoplastic film 18 in a cross direction perpendicular to the machine direction X.

The third roller is located downstream of the second roller and is adapted to receive the thermoplastic film 18 from the second roller, wherein the third roller is adapted to be rotated at a third peripheral velocity that is lower than the peripheral velocity. The third roller thereby allows the thermoplastic film 18 to contract or shrink during manufacturing.

The ratio of the third peripheral velocity to the second peripheral velocity may be chosen in the range of 0.95 or smaller.

Each of the rollers of the stretching device may in addition be adapted to be temperature controlled, so that the temperature of the respective roller may be adjusted to heat or cool the thermoplastic film 18 as it is advanced by the respective rollers.

For instance, the second roller and the third roller may each be provided with respective first and second heating devices, such as electrical heaters that are adapted to heat the second roller to a second temperature and to heat the third roller to a third temperature, respectively. A ratio of the third temperature to the second temperature may be chosen in the range of 1.03 or larger. The higher temperature of the third roller facilitates the reordering of the molecular structure of the thermoplastic film 18, and thereby allows the thermoplastic film 18 to contract, which reduces the risk of residual shrinkage in the final product.

Figure 2:
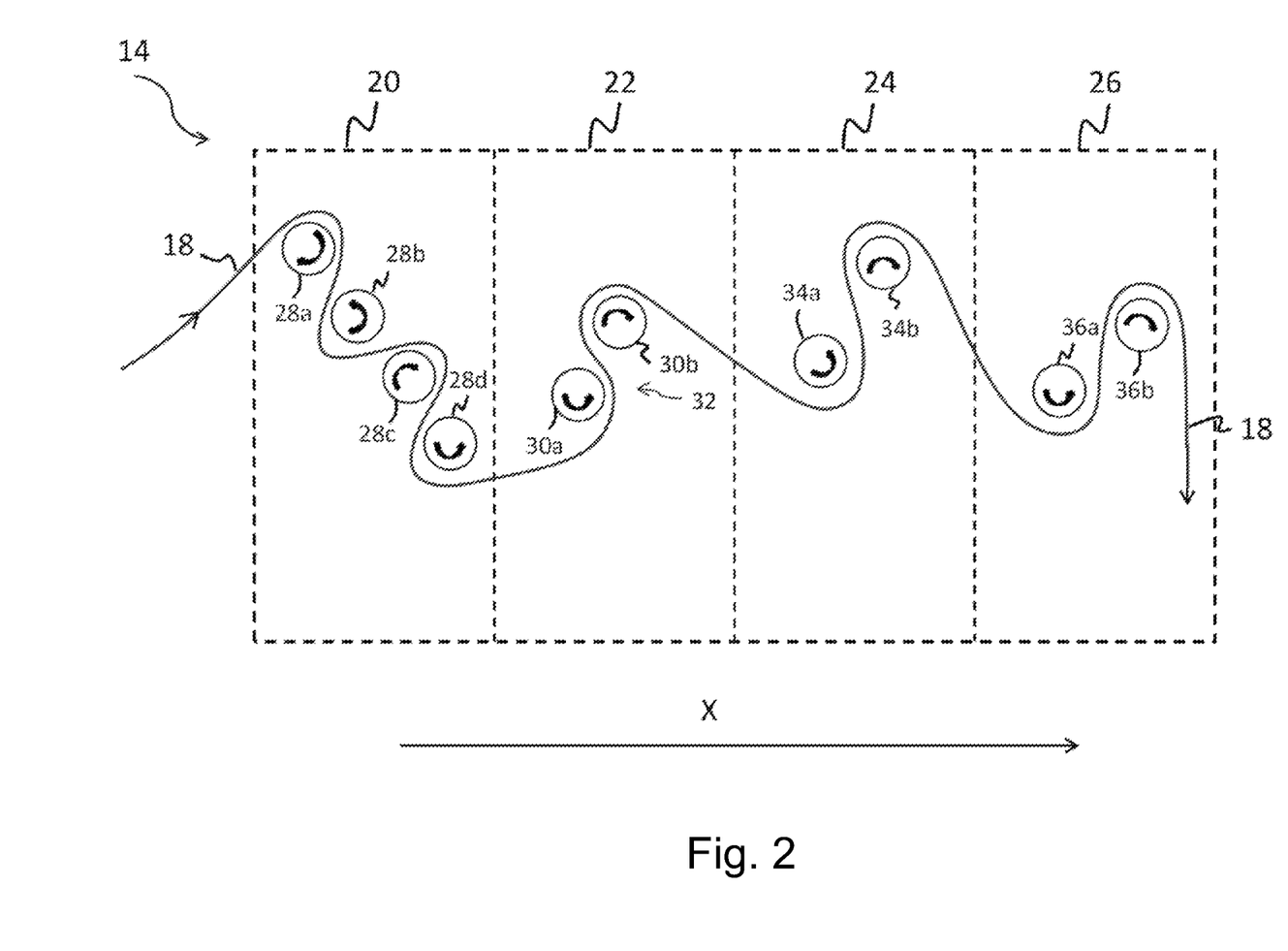
FIG. 2 is a schematic illustration of a stretching device for stretch-forming a thermoplastic film according to an example.

An example of a stretching device 14 according to the present disclosure is shown in greater detail in the schematic illustration of FIG. 2.

The stretching device 14 of FIG. 2 comprises a preheating unit 20, a stretching unit 22 (sometimes also referred to as orientation unit) downstream of the preheating unit 20 in the machine direction X, an annealing unit 24 downstream of the stretching unit 22 in the machine direction X, and a cooling unit 26 downstream of the annealing unit 24 in the machine direction X.

As further shown in FIG. 2, each of the preheating unit 20, stretching unit 22, annealing unit 24, and cooling unit 26 may comprise a plurality of rollers for advancing the thermoplastic film 18 through the stretching device 14, wherein each of the rollers of the stretching device 14 may be adjusted to rotate at a predetermined angular velocity and/or may be adapted to exert a predetermined tension force onto the thermoplastic film 18. Moreover, each of the rollers of the stretching device 14 may be temperature controlled to heat or cool the thermoplastic film 18 as it passes along the surface of the rollers through the stretching device 14.

In the example illustrated in FIG. 2, the preheating unit 20 comprises four pre-heating rollers 28a to 28d for pre-heating the extruded thermoplastic film 18 in stages to a pre-heating temperature. In other examples, the pre-heating unit 20 comprises a larger number or a smaller number of pre-heating rollers.

The stretching unit 22 comprises a first roller 30a adapted to advance the thermoplastic film 18 supplied by the pre-heating unit 20, wherein the first roller 30a is adapted to be rotated at a first peripheral velocity.

The stretching unit 22 further comprises a second roller 30b that is located downstream of the first roller 30a and is adapted to receive the thermoplastic film 18 from the first roller 30a. The first roller 30a and the second roller 30b define a stretching nip 32 or stretching gap in between, whose size may be adjusted by moving the first roller 30a and/or the second roller 30b relative to one another in the stretching unit 22.

The second roller 30b may be adapted to be rotated at a second peripheral velocity that may be considerably higher than the first peripheral velocity of the first roller 30a, so to stretch the thermoplastic film 18 in the stretching nip 32.

As explained in the Background section, the stretching in the stretching nip 32 leads to an orientation of the polymeric molecular chains along the machine direction X, and to the formation of micropores at the boundary of the filler particles. The resulting thermoplastic film is thin and has a high breathability.

The ratio of the second peripheral velocity of the second roller 30b and the first peripheral velocity of the first roller 30a is usually referred to as a stretching factor, and may be in the range of 2 to 5, depending on the composition of the thermoplastic film 18 and its intended application. A higher stretching factor may generally lead to thinner thermoplastic films 18, and hence a reduced basis weight.

The annealing unit 24 downstream of the stretching unit 22 comprises a first annealing roller 34a downstream of the second roller 30b along the machine direction X, and a second annealing roller 34b downstream of the first annealing roller 34a along the machine direction X. In some examples, the annealing unit 24 may comprise only one annealing roller, or more than two annealing rollers.

In the context of the present disclosure, the first annealing roller 34a and/or the second annealing roller 34b may be referred to as a third roller, thereby referring to their location downstream of the first roller 30a and the second roller 30b of the stretching unit 22.

The first annealing roller 34a and the second annealing roller 34b may be adapted to be rotated at respective third peripheral velocities that are lower than the second peripheral velocity of the second roller 30b. In some examples, the peripheral velocity of the first roller 30a and the second roller 30b is adjusted to be identical, whereas in other examples the peripheral velocity of the second annealing roller 34b differs from the peripheral velocity of the first annealing roller 34a. In particular, the peripheral velocity of the second annealing roller 34b may be lower or higher than the peripheral velocity of the first annealing roller 34a.

Similar to the pre-heating rollers 28a to 28d, the first annealing roller 34a and the second annealing roller 34b may each be equipped with a heating unit so as to adjust a temperature of the first annealing roller 34a and the second annealing roller 34b.

In some examples, the temperature of the first annealing roller 34a and the temperature of the second annealing roller 34b may both be adjusted to a temperature that is higher than a temperature of the first roller 30a and/or second roller 30b of the stretching unit 22.

The lower peripheral velocity of the first annealing roller 34a and/or the second annealing roller 34b compared to the second velocity of the second roller 30b in combination with the increased temperature allows for an efficient partial relaxation of the molecular orientation of the thermoplastic film after the stretching. As a result, the thermoplastic film 18 is less susceptible to shrinkage after fabrication. In particular, the techniques of the present enclosure allow to achieve a residual shrinkage of 5% or less in the fabricated film, even for very thin films with a basis weight of no larger than 15 g/m$^2$ and while still maintaining a high breathability.

In an example, the first annealing roller 34a is adjusted to rotate at a third peripheral velocity that is no larger than the peripheral velocity of the second roller 30b, and is heated to a third temperature that is at least 1.03 times higher or at least 5° C. higher than the temperature of the second roller 30b.

The second annealing roller 34b may be heated to approximately the same temperature as the first annealing roller 34a, and may be adjusted to rotate at a lower peripheral velocity than the peripheral velocity of the first annealing roller 34a. This allows for a relaxation of the microstructure of the thermoplastic film in stages. For instance, a ratio of the peripheral velocity of the second annealing roller 34b to the peripheral velocity of the first annealing roller 34a may be chosen to be no larger than 0.95.

The cooling unit 26 downstream of the annealing unit 24 comprises a first cooling roller 36a and a second cooling roller 36b, but may in other examples comprise either a single cooling roller or a larger number of cooling rollers. In the context of the present disclosure, the first cooling roller 36a and/or the second cooling roller 36b may be referred to as a fourth roller, due to their location downstream of the third rollers 34a/34b.

The first cooling roller 36a and/or the second cooling roller 36b may be driven to rotate at respective fourth peripheral velocities. In some examples, the peripheral velocity of the second cooling roller 36b is identical to the peripheral velocity of the first cooling roller 36a. In other examples, the peripheral velocity of the second cooling roller 36b is higher or lower than the peripheral velocity of the first cooling roller 36a.

In some examples, the peripheral velocity of the first cooling roller 36a and/or the second cooling roller 36b is lower than the peripheral velocity of the first annealing roller 34a and/or the second roller 34b.

Each of the first cooling roller 36a and the second cooling roller 36b may be equipped with cooling units, which may comprise a cooling liquid adapted to cool a surface of the cooling rollers 36a, 36b, and thereby cool the thermoplastic film 18.

The cooled thermoplastic film 18 can be passed on to the winder device 16 for winding of the thermoplastic film 18.

Figure 3:
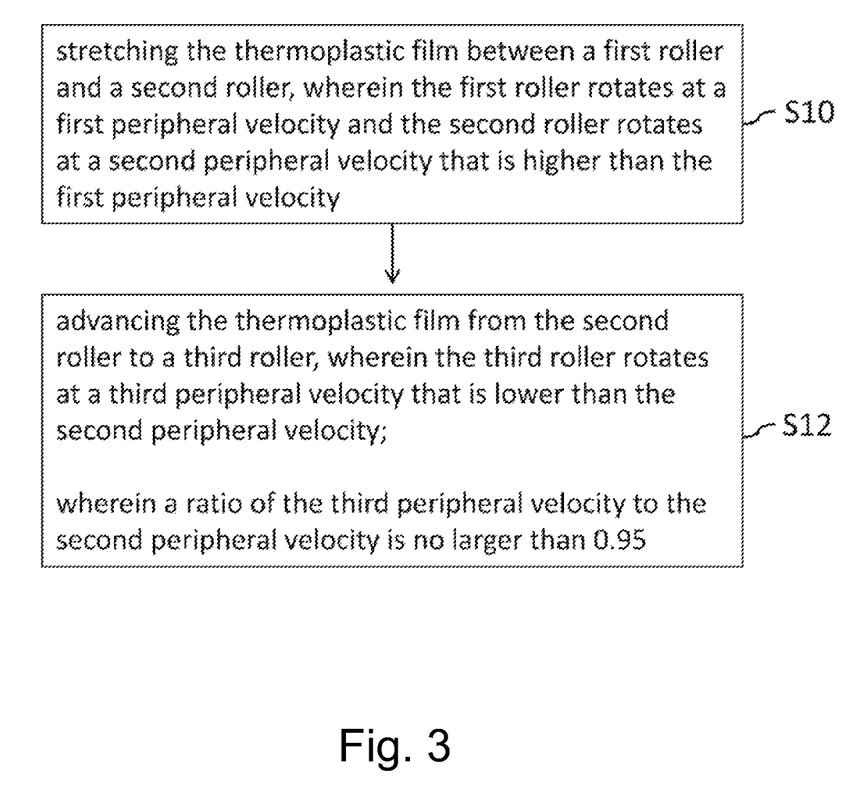
FIG. 3 is a flow diagram illustrating a method for stretch-forming a thermoplastic film according to an example.

FIG. 3 is a flow diagram illustrating a method for stretch-forming a thermoplastic film, such as by means of the stretching device 14 of FIG. 2.

In a first step S10, the thermoplastic film is stretched between a first roller and a second roller, wherein the first roller rotates at a first peripheral velocity and the second roller rotates at a second peripheral velocity that is higher than the first peripheral velocity.

In a second step S12, the thermoplastic film is advanced from the second roller to a third roller, wherein the third roller rotates at a third peripheral velocity that is lower than the second peripheral velocity, wherein a ratio of the third peripheral velocity to the second peripheral velocity is no larger than 0.95.

EXAMPLES

Several examples of a PET film comprising calcium carbonate as a filler were produced by blow extrusion and stretch-formed in a stretching device as described above with reference to FIG. 2.

The resulting thermoplastic film was analyzed in accordance with DIN 55543-4 to determine its residual shrinkage below its crystallite melting point. To this effect, strips of material having a length of 100 mm and a width of 15 mm were cut from the thermoplastic film 18, and were immersed into a hot bath of polyethylene glycol at 80° C. for 20 seconds.

The difference between the original length of the strip and the length after immersion was measured and compared to the original length. The resulting quantity (in percent) is the residual shrinkage.

However, other techniques of determining the residual shrinkage may likewise be employed. For instance, the residual shrinkage may be determined based on an area sample rather than a linear sample. The immersion temperature or immersion time may likewise be varied.

The residual shrinkage may alternatively be determined by heating samples in an oven, such as in a liquid polyethylene glycol bath.

The water vapor transmission rate of the samples was likewise analyzed according to the standard ASTM D-6701-01.

Example 1

A polymeric composite comprising PET and 85% calcium carbonate was blow extruded with a blowhead diameter of 400 mm. The resulting thermoplastic film was pre-heated in stages by a sequence of four pre-heating rollers 28a to 28d from 55° C. to 80° C. The speed of the film at the pre-heating rollers 28a to 28d was between 51.5 m/min at the first roller and 54.8 m/min at the last roller 28d. The first roller 30a and the second roller 30b of the stretching unit were adjusted to the same temperature of 80° C., with a stretching factor (peripheral velocity of the second roller 30b divided by the peripheral velocity of the first roller 30a) of approximately 4. The speed of the film was increased to appr. 224 m/min at the second roller 30b, resulting in a web tension of appr. 430 N. The temperature of the first annealing roller 34a and the second annealing roller 34b were set to 100° C. A velocity ratio of the peripheral velocity of the first annealing roller 34a to the peripheral velocity of the second roller 30b was set to 0.93. The peripheral velocity of the second annealing roller 34b was further reduced, with a velocity ratio of again 0.93 respective to the first annealing roller 34a.

The film was cooled at the first cooling roller 36a and second cooling roller 36b, which were water-cooled to temperatures of appr. 50° C. and 40° C., respectively.

The resulting film had a basis weight of approximately 12.9 g/m² and a water vapor transmission rate of at least approximately 7,500 g/(24 h m²). The shrinkage in machine direction was determined at 3.5% (immersion temperature 80° C./immersion time 20 seconds).

Example 2

A similar polymeric composition having 70% calcium carbonate was blow extruded with a blowhead diameter of 400 mm, and the resulting film was pre-heated in stages by the pre-heating rollers 28a to 28d from appr. 55° C. to a temperature of up to approximately 90° C. The speed of the film at the pre-heating rollers 28a to 28d was between 57.8 m/min at the first roller and 61.3 m/min at the last roller 28d. The temperature of the first roller 30a and the second roller 30b was likewise adjusted to 90° C., and the stretching factor (peripheral velocity of the second roller 30b divided by the peripheral velocity of the first roller 30a) was chosen at approximately 3.5. The speed of the film was increased to appr. 220 m/min at the second roller 30b, resulting in a web tension of appr. 375 N.

The temperature of the first annealing roller 34a and the second annealing roller 34b was set to approximately 100° C. The peripheral velocity of the first annealing roller 34a was set at 0.9 times the peripheral velocity of the second roller 30b, and the peripheral velocity of the second annealing roller 34b was set to 0.9 times the peripheral velocity of the first annealing roller 34a.

The film was cooled at the first cooling roller 36a and second cooling roller 36b, which were water-cooled to temperatures of appr. 50° C. and 40° C., respectively.

The resulting film had a basis weight of 13.8 g/m$^2$, a water vapor transmission rate of approximate 4000 g/(24 h m$^2$), and a residual shrinkage in machine direction of approximately 2% (immersion temperature 80° C./immersion time 20 seconds).

Example 3

A similar PET compound having 85% by weight calcium carbonate was blow extruded with a blowhead diameter of 400 mm. The resulting film was pre-heated by pre-heating rollers 28a to 28d from 55° C. to 80° C. The speed of the film at the pre-heating rollers 28a to 28d was between 54.1 m/min at the first roller and 57.4 m/min at the last roller 28d. The temperature of the first roller 30a and the second roller 30b was likewise adjusted to 80° C., and the stretching factor (peripheral velocity of the second roller 30b divided by the peripheral velocity of the first roller 30a) was set to approximately 4. The speed of the film was increased to appr. 234.4 m/min at the second roller 30b, resulting in a web tension of appr. 408 N.

The temperature of the first annealing roller 34a and the second annealing roller 34b was set to 100° C. each. The peripheral velocity of the first annealing roller 34a was set at 0.92 times the peripheral velocity of the second roller 30b, and the peripheral velocity of the second annealing roller 34b was set at 0.93 times the peripheral velocity of the first annealing roller 34a.

The film was cooled at the first cooling roller 36a and second cooling roller 36b, which were water-cooled to temperatures of appr. 50° C. and 40° C., respectively.

The resulting film was measured to have a basis weight of approximately 10.3 g/m$^2$, a water vapor transmission rate of approximately 4000 g/(24 h m$^2$), and a residual shrinkage in machine direction of approximately 3.5%.

The description and the Figures merely serve to illustrate the invention and its advantages, but should not be understood to imply any limitation. The scope of the invention is to be determined from the appended claims.

We claim:

1. A composition comprising:
   a breathable thermoplastic film, formed by a process involving stretching in at least a machine direction, the film having
   a basis weight of no larger than 14 g/m$^2$;
   a water vapor transmission rate of no smaller than 2,000 grams H$_2$O/(24 h m$^2$); and
   a residual shrinkage in the machine direction of no larger than 3%,
   wherein the shrinkage is determined by immersion of the thermoplastic film in a hot fluid bath at a predetermined immersion temperature for a predetermined immersion time, wherein the immersion temperature is no smaller than 60° C., and wherein the immersion time is no less than ten seconds.

2. The composition according to claim 1, the breathable thermoplastic film further having a water vapor transmission rate of no smaller than 3,000 grams H$_2$O/(24 h m$^2$).

3. The composition according to claim 1, wherein the breathable thermoplastic film comprises a filler.

4. The composition according to claim 3, the filler concentration being at least 30% by weight.

5. The composition according to claim 3, the filler concentration being at most 70% by weight.

6. The composition according to claim 1, wherein the thermoplastic film comprises polyethylene terepthalate.

7. The composition according to claim 6, wherein the thermoplastic film comprises a filler.

8. The composition according to claim 7, the filler comprising calcium carbonate.

9. A laminated article, comprising:
   a substrate; and
   at least one breathable thermoplastic film according to claim 1, wherein the breathable thermoplastic film is connected to the substrate.

* * * * *